324—77. SR
06-22-71    XR    3,586,843

United States Patent

[11] 3,586,843

| [72] | Inventor | Edwin A. Sloane |
| | | Los Altos, Calif. |
| [21] | Appl. No. | 786,869 |
| [22] | Filed | Dec. 26, 1968 |
| [45] | Patented | June 22, 1971 |
| [73] | Assignee | Ampex Corporation |
| | | Redwood City, Calif. |
| | | Continuation-in-part of application Ser. No. 379,611, July 1, 1964, now abandoned. |

[54] COMPUTER SYSTEM FOR PRODUCING VARIOUS FOURIER ANALYSES IN REAL TIME
12 Claims, 9 Drawing Figs.

[52] U.S. Cl............................................. 235/156, 235/150.5, 235/150.53, 235/181, 324/77 B
[51] Int. Cl............................................... G06f 15/34
[50] Field of Search......................................... 235/181, 197, 150.5, 151.3, 152, 156; 324/77 B

[56] References Cited
UNITED STATES PATENTS
3,328,686   6/1967   Fuchs.......................... 324/77

| 3,431,405 | 3/1969 | Dawson............... | 235/181 X |
| 3,441,727 | 4/1969 | Vieth, Jr.............. | 235/197 |
| 3,449,553 | 6/1969 | Swan................... | 235/152 X |
| 3,466,431 | 9/1969 | Fuchs et al......... | 235/151.3 |

*Primary Examiner*—Malcolm A. Morrison
*Assistant Examiner*—Felix D. Gruber
*Attorney*—Robert G. Clay

ABSTRACT: A computer for realizing Fourier transformations utilizing the mathematical realization that the Fourier transform can be synthesized by a sampling technique, wherein any sample of a time function can be described in the frequency or complex frequency domain by, for example, a sine and cosine function having a periodicity with respect to frequency that is proportional to the displacement of the sample from a selected time zero, multiplied by an amplitude proportional to the magnitude of the respective sample. In the basic embodiment the apparatus elements provide for the summation of the products of the sample amplitude and the appropriate sine and cosine function, whereby a continuous up-to-date Fourier transformation is available for all of the sampled time functions presented to the computer at any point in time.

COMPUTER SYSTEM FOR PRODUCING VARIOUS FOURIER ANALYSES IN REAL TIME

CROSS-REFERENCES TO RELATED APPLICATIONS

This is a continuation-in-part of application Ser. No. 379,611 filed July 1, 1964, now abandoned.

BACKGROUND OF THE INVENTION

One of the most powerful mathematical tools for time series analysis is the Fourier transform. The Fourier transform is commonly expressed as:

$$F(w) = \int_{-\infty}^{+\infty} f(t) e^{-jwt} dt \quad (1)$$

while the inverse Fourier transformation is:

$$f(t) = \frac{1}{2\pi} \int_{-\infty}^{+\infty} F(w) e^{-jwt} dw \quad (1a)$$

where $f(t)$ is some function that varies with time and $F(w)$ is some function of frequency. From this it can be seen that the transforms provide a means for converting time domain data to the frequency domain and frequency domain data to the time domain. The derivation of these transforms is also an important and necessary step in solving for correlation, auto correlation, power density spectrum, and cross spectrum to mention a few.

The transformation problem is frequently encountered by the research scientist, engineer, statistician, business forecaster, military strategist and process controller. These problems may factually include the analysis of time varying scientific experimental data, analysis of transients or the synthesis of a system based on theoretical data. For example in an antenna design the Fourier transformation can be applied to the calculation of the radiation patterns if the aperture energy distribution is known and conversely the necessary aperture distribution can be determined from the field intensity patterns. Another interesting example that demonstrates the need for time domain to frequency domain transformation is in the design of transducers. The time data transduced is converted to the frequency domain to determine transducer response and enable the design of inverse filters to compensate for any frequency deficiency in the transducer's response. In addition, it is possible to synthesize the behavior of ideal systems, that is physically nonrealizable systems, for purely theoretical studies. From these facts which evidence the need for Fourier transformations, the importance of an economic solution becomes apparent.

The solution for the Fourier transform has been performed in the past by digital or analog computers and in a few instances by the combination of a general purpose digital computer and an analog computer. Digital computers, such as the IBM 1620 or the Control Data 6600, have been used to solve the transform. Systems such as the Control Data 6600 are very fast and may approach processing data on a real time basis but smaller systems such as the IBM 1620 do not allow real time computation. The programing requirements and the necessity to conform incoming data to a particular computer format further limits the application of general purpose digital computers. In addition, the size and cost of such units limit their availability and usefulness.

The analog computers while lower in cost and tending to minimize programing problems are slow and unable to process data on a real time basis. (Real time implies that the data is processed as received with results available a very short time thereafter, such as part of a second.) Analog machines have the further shortcoming of lacking storage capacity and versatility. A typical analog machine is disclosed in U.S. Pat. No. 3,087,674 issued to A. B. Cunningham et al. on Apr. 30, 1963.

SUMMARY OF THE INVENTION

The above shortcomings of the prior art digital and analog devices are overcome by the invention. Briefly, the invention arises from the mathematical realization and appreciation that the Fourier transform defined by the integral of equation (1) can be synthesized by a sampling technique. The sampling technique is based upon the fact that any sample of a time function can be described in the frequency or complex frequency domain by a cosine and sine function having a periodicity with respect to frequency that is proportional to the displacement of the sample from time zero multiplied by an amplitude proportional to the magnitude of a sample. The summation of the products of the sample amplitudes, $A_n$, and the appropriate cosine and sine functions, will result in an analog or equivalence of the Fourier transform of the sampled time function. This summation is stated mathematically by the following expression:

$$f(w) = \frac{w_y}{2\pi} \sum_{-n}^{+n} A_n [\cos(w_x + nw_y)t - j\sin(w_x + nw_y)t] \quad (2)$$

This expression is considered in detail later in the specification. Similarly, the inverse transformation may be obtained by processing a frequency function such as the derived Fourier transformation.

The system which takes advantage of the above mathematical facts comprises a means for generating a trigonometric function or more particularly a succession of sine and cosine functions having a corresponding succession of frequencies proportional to their respective positions in time or from a selected time zero, a means for sampling the time function (or frequency function) input signal at selected sampling times and for generating a signal proportional to each amplitude taken along the sampled function, a means for multiplying the sine and cosine function representative of a particular sampling time by the amplitude of that sample to form a sample product, and means for accumulating a plurality of sample products corresponding to the succession of samples taken.

It is the general object of the invention to overcome the above shortcomings of the prior art, and to provide a relatively low cost, high speed, computer system that performs Fourier analysis and related analysis on a real time basis;

Another object of the invention is to provide a computer that performs Fourier analysis at lower cost and higher speeds than any heretofore known system;

Another object of this invention is to provide a computer that may be operated to solve a multiplicity of problems without the need for extensive programing;

Another object of this invention is to provide a computer that utilizes analog data or other data which has not been previously conformed to a selected or digital format;

Another object of this invention is to provide a computer which may perform Fourier analysis, which in turn may be readily utilized to solve other mathematical problems such as the power density spectra, the inverse transform, auto cross-correlation, linear constant coefficient differential equations and time varying filters.

DESCRIPTION OF THE PREFERRED EMBODIMENTS

Mathematical Explanation

Figures 1, 2, 3A:
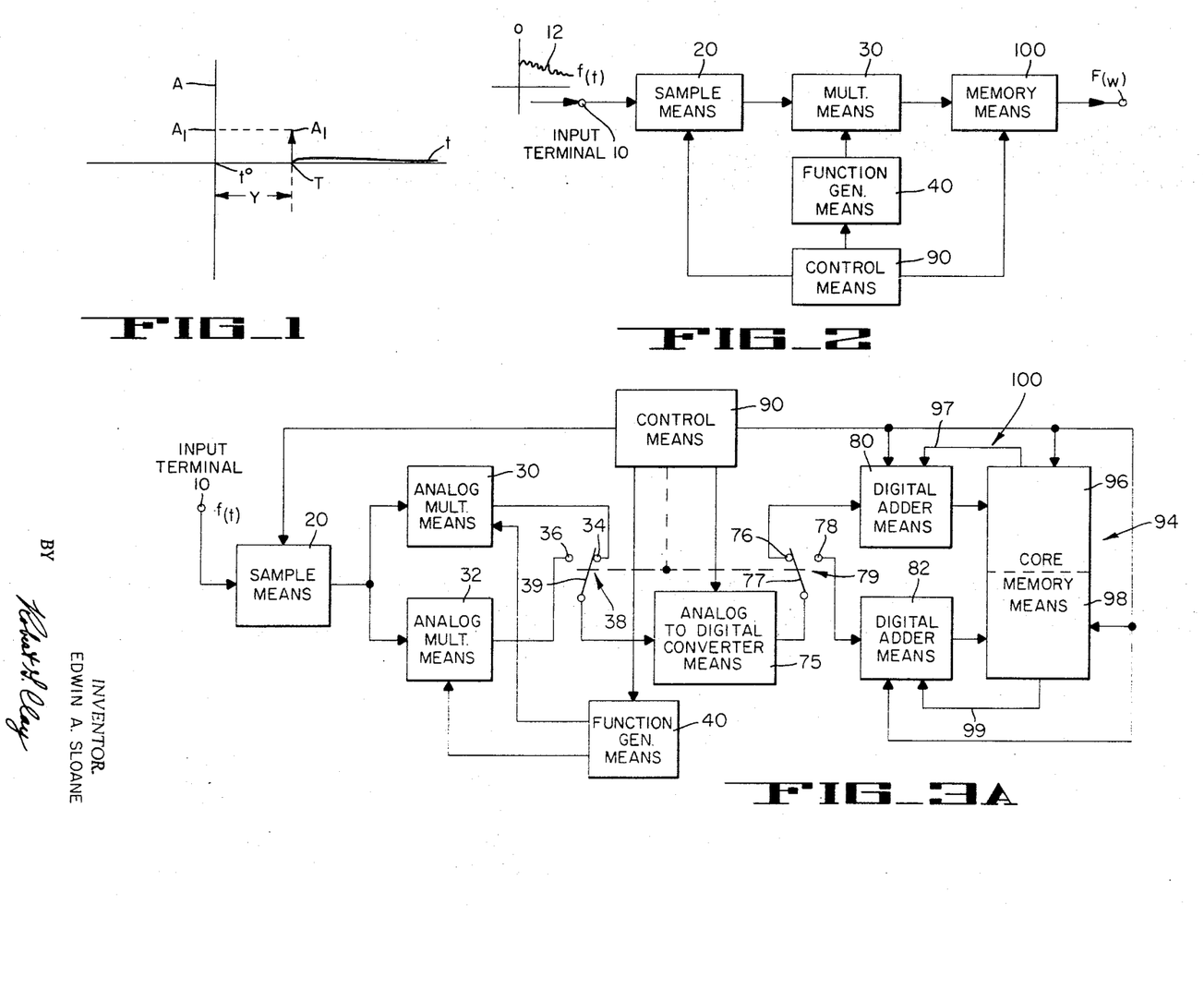
FIG. 1 is a diagrammatic showing of an impulse or sample function.
FIG. 2 is a block diagram of a simplified system for Fourier analysis which embodies the invention.
FIGS. 3A and 3B are expanded and more detailed block diagrams of systems for performing Fourier analysis on time function data having only real components.

At the outset of the detailed description the mathematical facts forming the basis of the invention should be reviewed. There are a number of rigorous mathematical proofs that may be utilized to explain the mathematical basis for this invention. However, for the purpose of this description the simplest and most graphic explanation has been selected. This proof can be understood by considering FIG. 1 and the simple impulse or sample function A that can be expressed as:

$A_{sample}$ is an impulse of magnitude A at $t=T$. (3)

The Fourier transform for equation 3 is:

$A(w) = A(e^{jwT})$ (4)
$= A(\cos wT - j\sin wT)$ (5) Note that for ease in presentation $w$ has been substituted for $\omega$ (omega).

While only the Fourier transform is considered in the discussion which follows it should be realized that the inverse transformation involving a frequency function as input may be obtained by similar techniques. The sample of such a frequency function may be expressed as:

$B_{sample} = \delta(w-w_o)$ (3a)

$B_{sample}$ is a sample of B magnitude at $w=w_o$. The inverse Fourier transform of equation (3a) is:

$B(5) = B e^{+jw_o t}$ (3b)

Now returning to the Fourier transform and to a time function other than an impulse function, such a function can be expressed by applying the Nyquist sampling technique assuming the time function is bandwidth limited. This technique stipulates that the frequency or the information in a signal can be determined or defined by taking samples at a rate equal to or less than the Nyquist rate. The Nyquist rate is a rate of two times the maximum frequency of the signal sampled. For example, if the bandwidth of the input data is 0—50 Hertz per second a sample rate of 100 samples per second is proper. Realizing that each sample is nothing more than an impulse function and utilizing the Nyquist technique for a bandwidth limited function, expression (5) becomes:

$$f(w) = \tau \sum_{-n}^{+n} A_n \cos w(t_o + n\tau) - j\tau \sum_{-n}^{+n} A_n \sin w(t_o + n\tau)$$
(6)

$A_n$ is the amplitude of the $n$ sample, $\tau$ is the Nyquist interval and $n$ is an integer corresponding to the position in time of the $n$th sample. In the above expression, $t_o + n\tau$, is a generalized definition of T in terms of the sample interval.

Equation (6) can be related to a time analog by the following substitutions (The $\rightarrow$ is a symbol for the expression "corresponds to."):

$w = 2\pi f \rightarrow 2\pi t$
$t_o \rightarrow f_z$
$\tau \rightarrow f_y$ so that $$f(w) = f_y \sum_{-n}^{+n} A_n \cos 2\pi t[f_z + nf_y] - jf_y \sum_{-n}^{+n} A_n \sin 2\pi t[f_z + nf_y]$$
(7)

and letting $w_z = 2\pi f_z$
$w_y = 2\pi f_y$ the following is obtained:

$$f(w) = \frac{w_y}{2\pi} \sum_{-n}^{+n} A_n [\cos(w_z + nw_y)t - j\sin(w_z + nw_y)t]$$
(8)

It can be shown that this expression (8) is periodic and infinite in time. This makes it necessary that only a single period be specified to describe the information contained in equation (8). Further, since the real part of the complex Fourier transform of a real time function (corresponding to the cosine Fourier transform) is always an even function, and the imaginary part (or sine Fourier transform) is always an odd function, the necessary and sufficient description of the transform or its analog is contained in a single half period of equation (8). (It should be appreciated that it is (8symmetry of odd and even functions that enables the transform to be defined in half a period.) The invented computer takes advantage of this phenomena and the fact that $f(w)$ is proportional to a cosine and sine with a frequency proportional to time ($t$) from time zero and with an amplitude proportional to the sample ($A_n$).

The above derivation is for the special case where the imaginary data of the time function is zero. It may be proven that the same concept is applicable to complex time data functions which is the more general case. In such a general case the expression (8) may be written as:

$$f(w)_{complex} = \frac{w_y}{2\pi} \sum_{-n}^{+n} \{A_n \cos(w_z + nw_y)t + B_n \sin(w_z + nw_y)t\}$$
$$-j\frac{w_y}{2\pi} \sum_{-n}^{+n} \{A_n \sin(w_z + nw_y)t - B_n \cos(w_z + nw_y)t\}$$
(9)

This function, also periodic in time, differs from equation (8) in that the real and imaginary parts do not in general exhibit even and odd symmetry respectively. Here the necessary and sufficient description must include the half period of negative frequencies as well as positive frequencies. It is understood that a negative frequency represents a vector rotating in one direction and a positive frequency a vector rotating in the opposite direction. The computer system for generating the solution to equation (9) will be discussed with regards to FIG. 6.

Basic System

With this mathematical background in mind, the structure of FIG. 2 can be better appreciated. The input data or a signal representative of data is supplied to the input terminal or means 10. This input signal may take the form of virtually any function that varies with time. (The computer may receive frequency domain data if an inverse transformation is being generated.) The signal may be supplied by any of the well known transducer elements such as strain gauges, magnetic heads, thermocouples, sonar devices, geophones, and many other devices. The input may alternately be supplied by some storage means such as a magnetic tape recorder which also may be used to accomplish time base alterations of the input data. The input signal supplied to the terminal 10 will preferably take the form of an analog signal. It is, however, within the broad scope of the invention to adapt the system for a digital input signal or a previously sampled signal that is either directly supplied to the input terminal 10 or first stored in a storage means. In the embodiment shown in FIG. 2 the input signal takes the analog form shown at 12.

The input terminal 10 is connected to a sample means or a sample and hold circuit means 20. Sample and hold circuit means are well known in the electronic art as described in "Computer Handbook" by H. D. Huskey and G. A. Korn, McGraw-Hill Book Co., Inc. (1962), pages 6—26 and 6—27, and "Sampled Data Control Systems" by J. F. Ragozzini and G. F. Franklin, McGraw-Hill Book Co., Inc. (1958). The sample means 20 functions to periodically sense or sample the input signal 12 and retain this sampled value for a certain time interval. For example, in order to transform input data having a bandwidth of 50 Hertz per second, the input data would be sampled at least every 10 milliseconds. The sampled value would be retained in the sample and hold circuit means and applied to a multiplier means 30. The sampling in the preferred embodiment takes place at regularly and equally spaced intervals in accordance with the Nyquist criteria for the input signal 12. The value of the sampled signal is analogous to the term $A_n$ in equation (8). For ease in presentation, the sample and hold means 20 is hereinafter referred to as simply the sample means 20.

It should be understood that it is consistent with this invention to sample at any selected rate and immediately or subsequently transferring the sampled amplitude to a multiplier means 30. It may, in a specific application, be advantageous to include a buffer means or a temporary storage device after the sample means 20 for subsequent processing of the sampled signal or for timing purposes.

The multiplier means 30 has a first input connected to the sample means 20. Typically, the means 30 takes the form of an analog type multiplier, such as the ones disclosed in the publication "Computer Handbook" of previous mention, pages 3—40 to 3—51. The multiplier means 30 may take the form of an analog to digital converter which substantially simultaneously performs a multiplication operation and also transforms the analog signal from the sample means 20 to a digital or binary quantity. It is within the scope of the invention to immediately convert the signal from the sample and hold circuit means 20 to a digital form and to then use a digital multiplier means, or to use analog multiplier means 30 and then convert to a digital form, if necessary. There are an abundant number and form of multipliers that may be used with the invented system. Their use would largely depend on specific system requirements and then compatibility with other system elements.

A second input of the analog multiplier means 30 is connected to a function generator means 40 which supplies the second quantity that is to be multiplied by the multiplier means 30. The function generator means 40 generates or voltage, having the form of a trigonometric function or more particularly a sine and/or cosine function that has a frequency which periodically is changed according to the passage of predetermined time intervals, i.e., according to its position in time from the selected time zero of previous mention. More particularly the generated function is analogous to the expression $[\cos(w_z + nw_y)tt - j\sin(w_z + nw_y)t]$ of equation (8). As related to FIGS. 1 and 2, the time zero ($t_o$) may be defined in a number of ways. For example, time zero may be defined as the time when the first input signal is sampled, or alternately may be defined as the time at which zero frequency is generated by the function generator means 40. As time passes and the value of "$t$" becomes greater the function generator means will generate sine and cosine function signals with a greater (or lesser) frequency during each sample interval of the sample and hold means 20. If time zero is defined to occur later than the first sample, the frequency will initially decrease, may pass through zero, and then may commence to increase. The rising or decreasing frequency of the output of the function generator means 40 takes place in incremental steps. These incremental steps are related directly or indirectly to the sampling interval and more particularly to the specific instance that each sample is taken. For example, if $t_o$ is selected at the time when the first input signal is sampled, during the first sample interval taken at $t_o$ (FIG. 1) the frequency of the generated function would be zero; during the second sampling interval with the sample taken at T or $\tau$, the frequency would be 50 Hertz per second; during the third interval with the sample taken at $2\tau$, 100 Hertz per second, and so on.

On the other hand, as further described below, when the time zero is selected at the midpoint of the input signal duration, the first frequency generated is 350 Hertz per second and signal corresponding to such frequency is multiplied by the sample taken at that time; the second frequency is 300 Hertz per second, which signal is multiplied by the second sample taken; the third signal frequency generated is 250 Hertz per second multiplied by the third sample, and so on, until at time zero a DC level is multiplied by the sample taken. Then the frequency steps increase back up to, for example, 350 Hertz per second, wherein the signal corresponding to each frequency is again multiplied by its respective sample. The only requirement is that the frequency of the function generated be approximately related or proportional to the time displacement of the sample from $t_o$, which sample is multiplied by the generated function. The time of the multiplication or the time of the generation of the function is not particularly significant. It is only the value generated and its relation to the sample that is generally important. It should be understood that time zero may be selected at some point after the first sample, and as noted above, it is particularly advantageous to locate time zero midway between the first sample and the last sample, i.e., midway of the input signal duration. The workings of the function generator 40 as well as the time relation between the sampling and function generating processes will be explained in greater detail with regards to FIGS. 4A, 4B and 5.

The function generator means 40 is controlled by a control means 90 which is also operatively connected to the sample means 20. The control means 90 triggers or enables the function generator means 40 in a predetermined manner consistent with its control of the sample means 20. The sample means 20 is enabled by the control means 90 to sample the input at a given instant, and at a properly related instant the function generator means 40 is enabled to generate a function of a frequency related to the sample interval. The manner in which the means 20, 40 and 90 are triggered, their timing relation, and the pulse signals employed, are particularly further described with reference to FIGS. 5 and 7 below. Thus the control means 90 provides for synchronous operation of the various elements of the combination, by supplying an initial series of clock pulses which are timed to directly or indirectly control the operation of the various elements, initial series of clock pulses or via other pulse signals generated thereby, in a manner well known in the fields of computer technology and digital systems, and as further described hereinafter by way of example in FIGS. 4A, 4B and particularly FIGS. 5 and 7. Other typical control means employing a clock device are described in the book "Digital Computer Design" by Edward L. Braun, Academic Press, pages 95 and 96 (1963). Further circuitry capable of generating and supplying a sequence of timed pulses such as provided by the control circuit 90 of FIG. 7, may be found on pages 266—275, pages 378—412 of Chapter 7 and throughout Chapter 4 of the book by Braun. Additional information on control circuits for supplying clock pulses may be found in the bibliographies thereof on pages 97—99, 188—192, and 447. The control means 90 may take the form of transistor circuitry, integrated circuitry or the more traditional switching and electronic tube arrangements.

Figure 7:
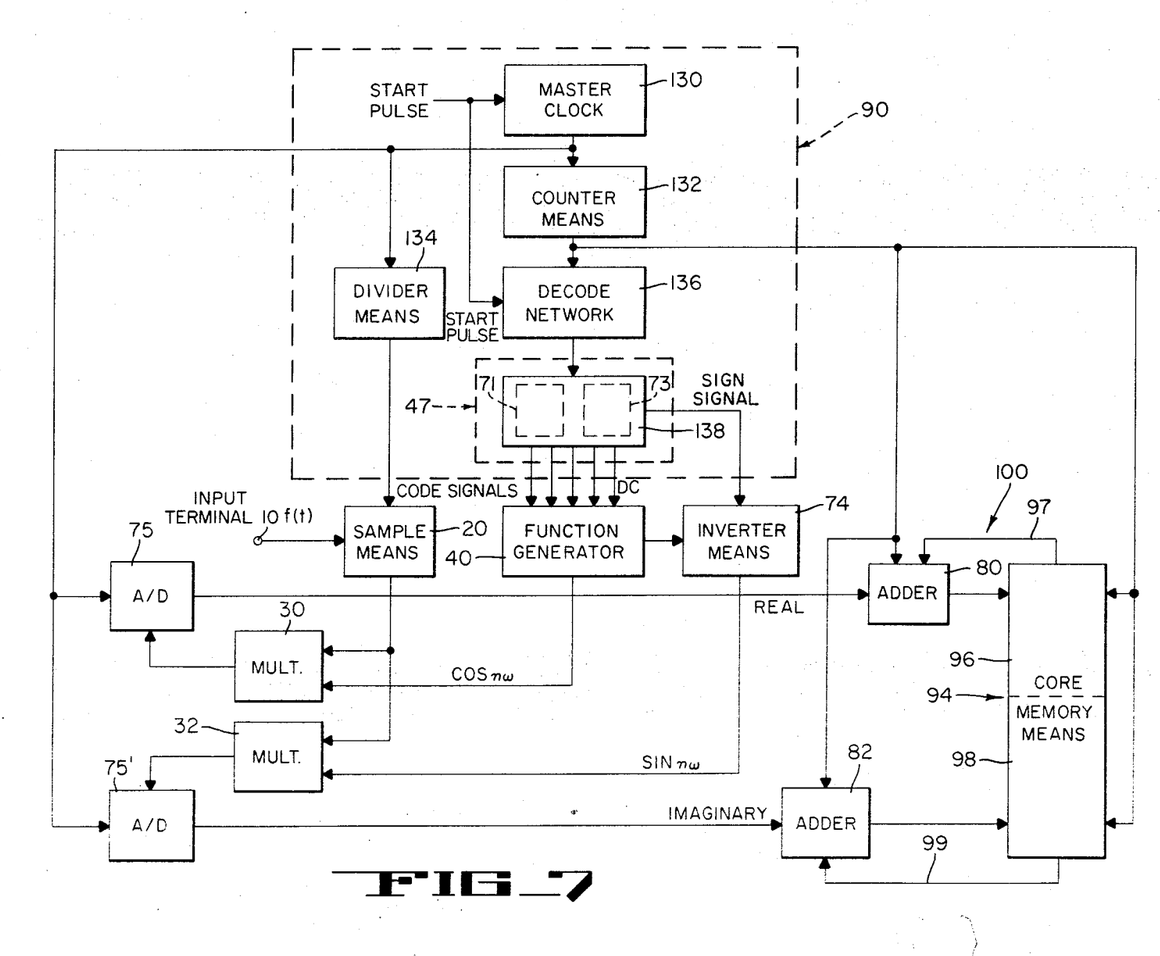
FIG. 7 is a block diagram showing further details of a typical control circuit for the systems of FIGS. 2—6.

The control means 90 is also coupled to the memory means 100 for enabling the memory means 100 in a manner shown and described more fully in FIG. 7. The memory means 100 is connected to the output of the multiplier means 30 (preferably via analog to digital converter means, as described below), and is adapted to store the products of the multiplier. More detail of the means 30, 90 and 100 and their interconnections are shown below, and accordingly are not further discussed here. A coherent memory means may typically be used in the system. Coherent in this sense means that each sine and cosine function multiplied by a sample amplitude (sample product) is consistently added to the previous sum of sample products of sine and cosine respectively with identical phase or linearity. It is, of course, within the scope of the invention to utilize core memories with associated logic circuitry, read circuitry, write circuitry and registers, thin film memories, cryogenic memories, drum type memories, random access memories, circulating delay lines, analog format memories and other of the well known memory devices. Such devices are set forth in the book "Digital Computer Design" by Edward L. Braun, pages 194—256.

The structure of FIG. 2 can be more fully understood by considering a typical mode of operation. Considering the system to be in the Fourier transform mode of operation, the presence of an input signal at the input means 10 is sensed and either temporarily stored in a buffer means, a time base adjusting means, or immediately processed. In any event the control means 90 eventually begins its operation and enables the sample means 20 to sample the input signal. The control means 90 is synchronized with the function generator means 40 to generate a trigonometric function, or sine and cosine output signal, that has a frequency representative of the displacement of the sample from time zero. The signal derived by the sample means 20 and the output signal of the function generator means 40 are transmitted to the multiplier means 30 and form inputs thereto. The multiplier means 30 acts upon these inputs and supplies the product of the amplitude-sample and the generated functions to the memory means 100. Thus, each sample is multiplied by a signal corresponding to a successive, associated frequency of the generated sine and cosine waveforms and the product signal is delivered to the memory means. The memory or accumulator means 100 stores and accumulates the successive values of the sample product in response to signals from the control means 90 (as further described below in FIG. 7) which signals scan the memory, whereby at the end of the input signal duration the analog or equivalent signals of the Fourier transform are stored therein. This stored Fourier transform may be supplied to any of the well-known output means such as magnetic tape systems, data plotters, cathode-ray tubes, punched cards, printers or other utilization devices. For example, the stored Fourier transform signals (or inverse transform) may be employed in adjunct apparatus (not shown) to derive the power density spectra, cross spectra, auto correlation or cross correlation functions, etc.

The above description of the system is general in nature for the purposes of emphasizing the broad aspects of the invention and to emphasize the inventive system concept.

Figure 3B:
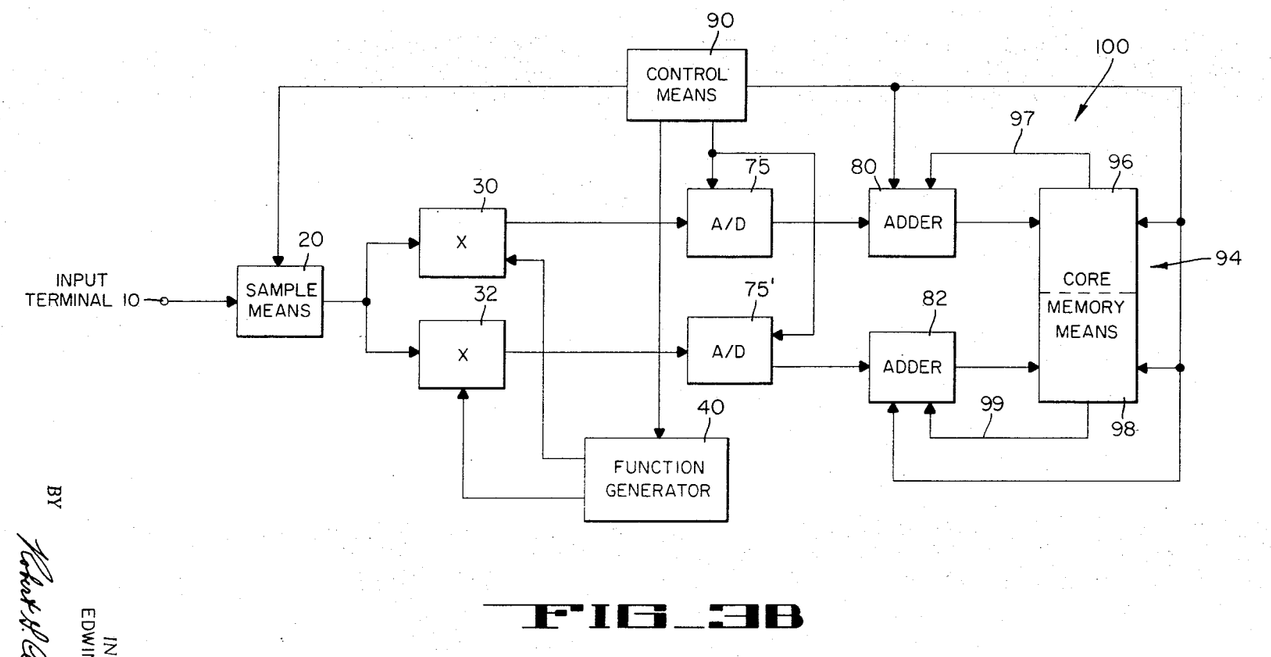

The specific systems constructed in accordance with the invention are shown in FIGS. 3A and 3B. Regarding first FIG. 3A, this system has a sample means 20 which is essentially identical with the sample means shown in FIG. 2. The sample means 20 is constructed to sample the input signals supplied to the input terminal 10 at the Nyquist rate consistent with the bandwidth of the input signal. The initiation of the sampling is controlled by the control means 90 as described with regards to FIG. 2 and as further described with respect to FIG. 7.

The sample signal derived by the sample means 20 is connected and applied to a pair of analog multiplier means 30 and 32. The analog multiplier means 30 is also connected to the cos (nwt) output of a function generator means 40 while the analog multiplier means 32 is connected to the sine (nwt) output of the function generator means 40. The function generator means 40 generates the cosine and sine functions as explained with regards to FIG. 2, and is controlled by the control means 90 as further described relative to FIG. 7, so that the frequency of the generated function is related to the passage of predetermined time intervals, i.e., according to the position of the sample from time zero. With the sample and the frequency functions supplied to the analog multiplier means 30 and 32 in analog form, an analog product is generated at the output terminals 34 and 36.

The output terminals 34 and 36 are connected to an analog digital converter means 75 by a switch means 38. The switch means 38 is shown schematically as a switch arm 39 but in reality it is a solid state or transistor switching member controlled by the control means 90. The control means 90 enables the switch means 38 alternately and in a predetermined time sequence to connect the analog multiplier means 30 and 32 to the analog to digital converter means 75. This enables the converter means 75 to be shared and results in an economic utilization of this relatively expensive component. It is, of course, within the scope of this invention to utilize two analog to digital converter means 75. One would be connected to the terminal 34 while the other would be connected to the terminal 36. The analog to digital converter means 75 may be any of the well known devices such as is described in the book "Computer Handbook" of previous mention by H. D. Huskey and G. A. Korn, pages 18—29 to 18—42.

The output of the converter means 75 is a digital, binary coded or binary signal that is transmitted to the input terminals 76 and 78 of the digital adder means 80 and 82. More specifically a switch arm 77 of a switch means 79 moves between the input terminals 76 and 78, like the switch arm 39 of switch means 38, and likewise is controlled by the control means 90. Typically, the switch arm 77, i.e., switch means 79, takes the form of a solid state or transistor switching circuit which enables the output of the converter means 75 to be applied alternately to the digital adder means terminals 76 and 78. This output is applied in synchronism with the movement or energization of the switch means 38, that is, the switch means 38 is connected to the input terminal 34 of the multiplier means 32 when the switch means 79 is connected to the input terminal 76 of the digital adder means 80, and the switch means 38 is connected to the terminal 36 when the switch means 79 is connected to the terminal 78. It is, of course, within the concept of the invention to alter the switching sequence or periods in accordance with the demands of a particular system. The entire switching scheme is unnecessary if two converter means 75 are provided. In such a case the second analog to digital converter means 75 is connected to the input terminal 78 as described infra with respect to FIG. 3B.

Digital adder means 80 and 82 may take any of the usual and well known forms such as is described in "Digital Computer Design" by Edward L. Braun, pages 275—307. The digital adder means 80 and 82 are connected to the core memory means 94 that forms part of the coherent memory. The core memory means 94 is divided into two sections 96 and 98, for the purpose of information storage, each section having a plurality of multiple digit words. The core memory section 96 is for the storage of the real component of the Fourier transform while the core section 98 is for the storage of the imaginary component of the Fourier transform. Typically, the core memory means 94 includes four sections each including 1024 words having 18 bits per word. Two of the four sections are used to store the two components of the Fourier transform while the other sections would be utilized for storing the results of other computations. The Ampex RZ Memory is a commercially available core memory which is well suited for this function. The core memory section 96 and 98 may have buffers or auxiliary registers (not shown) associated with them as necessary to accomplish the input and output data transfers. The core memory sections 96 and 98 and their associated logical sense and drive circuitry are connected to the control means 90 which enables data to be transferred to and from the core memory means 94 at appropriate times as further described infra in FIG. 7. It should be recognized that an analog to digital converter means is in the nature of a sampling means and in order to generate the representative digital signal it may typically take about 1000 samples resulting in the storage of over 1000 words for the storage of a given sample product. The addition of subsequent samples or digital signals would tend to fill a 1024 word storage capacity.

The core memory section 96 has an output 97 that is connected to the digital adder means 80 while the core section 98 has a similar output 99 connected to the digital adder means 82. The digital adder means 80 and the core memory section 96 form a closed loop coherent memory for the real component of the Fourier transform while the core memory section 98 and the digital adder means 82 form a similar coherent memory for the imaginary component of the Fourier transform. These coherent memories as previously described enable the sample-frequency product for each sample to be continually added to the value stored in the core memory means 94 in response to signals from the control means 90. This provides a real time computation and will result in the availability of the Fourier transform of the input signal substantially simultaneously with the termination of the input signal to the input terminal 10 that is within one sample interval thereafter.

Referring now to FIG. 3B there is shown an alternative configuration of the invention of FIG. 3A, wherein the switch means 38 and 79 are omitted and second analog to digital converter means 75' is added. The circuits are otherwise essentially similar except that the control means 90 supplies pulses to both the converter means 75 and 75' simultaneously.

The operation of the systems of FIG. 3A and 3B will now be described. A time function is supplied to the input terminal means 10 and is transmitted to the sample means 20 wherein it is sampled and a representative sample signal is supplied to the analog multiplier means 30 and 32. The multiplier means 30 is supplied with a cosine function signal having a frequency representative of the displacement of the sample signal from time zero while the multiplier means 32 is supplied with a sine function having a similarly related frequency. These trigonometric functions are supplied by the function generator means 40 which is controlled by the synchronizing pulses generated by the control means 90. The control means 90 also controls the sample means 20 so that the multiplier means 30 and 32 receive the sample signal related to the trigonometric functions. The analog multiplier means 30 and 32 generates a sample-frequency product that is converted from its analog form to a digital form by the analog to digital converter means 75 (and 75' in the circuit of FIG. 3B) which in turn supplies its digital output to the coherent memory means 100. The memory means 100 comprising the digital adder means 80 and 82 and the core memory sections 96 and 98 is accessed for each sample-frequency product by control means 90, and accumulates the successive sample-frequency products. At the termination of the time function at the input terminal 10 the Fourier transform of said time function will be stored in sections 96 and 98 respectively. As previously noted, the control means 90 synchronizes the operation of the various means to which it is coupled, by providing clock pulses thereto in the selected operating sequence hereinbefore mentioned and further described with reference to FIGS. 5 and 7.

FUNCTION GENERATOR MEANS

Figure 4A:
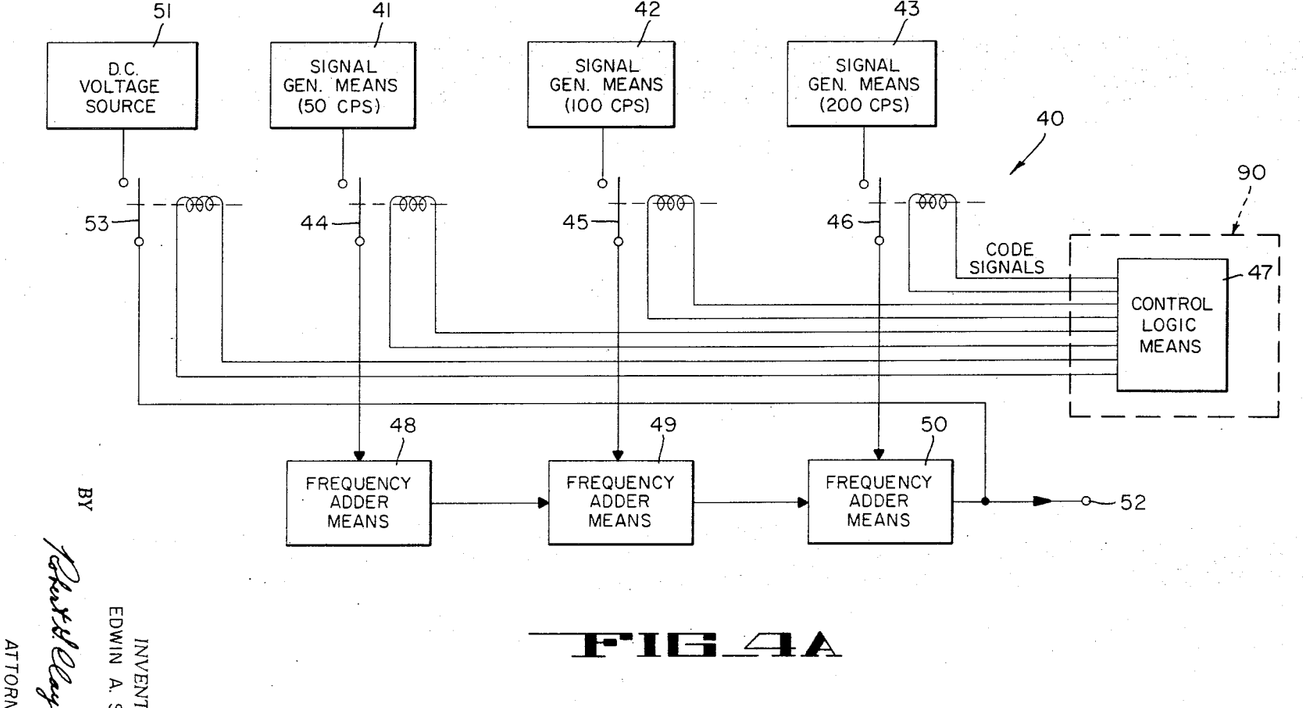
FIG. 4A is a simplified system block diagram for a typical function generator means that may be used in conjunction with the systems shown in FIGS. 3A and 3B.
Figure 4B:
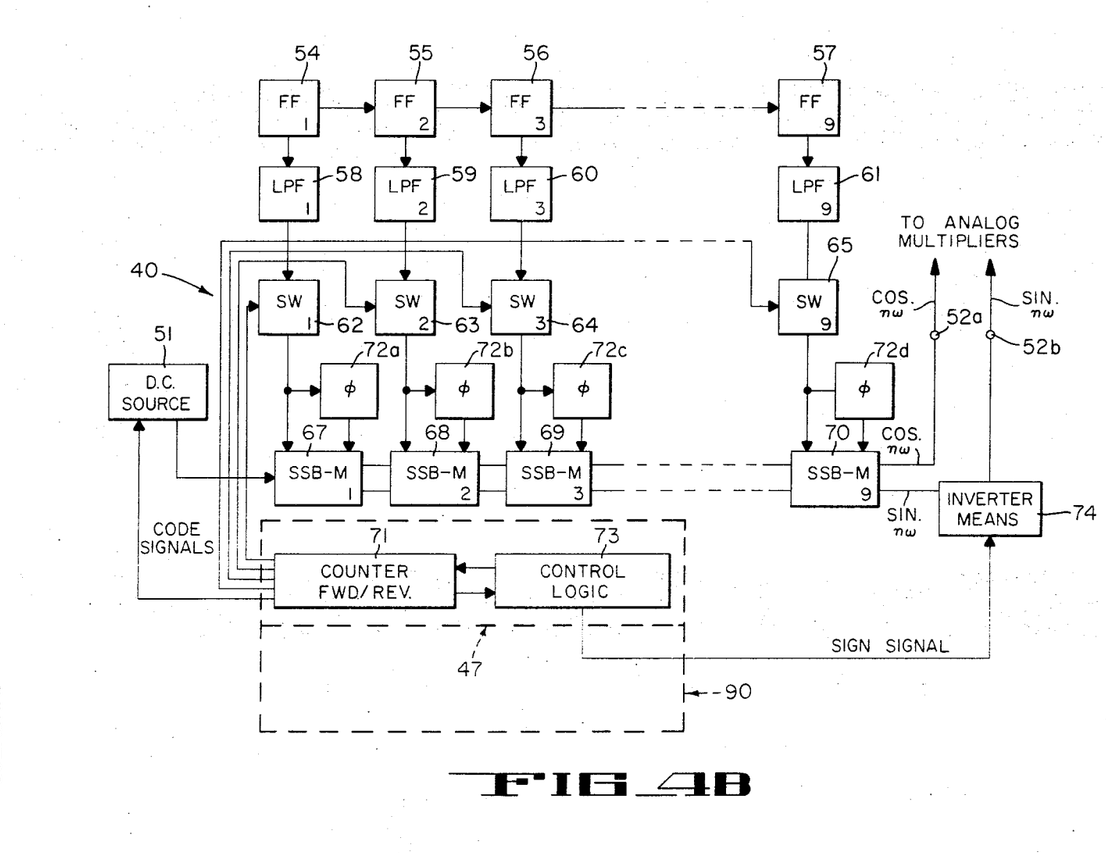
FIG. 4B is a more detailed block diagram of a function generator means of the type shown FIG. 4A.

The function generator means 40 shown in FIGS. 2, 3A and 3B is shown in greater detail in FIGS. 4A and 4B. FIG. 4A shows a rudimentary system while FIG. 4B shows a more detailed system. These systems generate a trigonometric, sine or cosine function or waveform that has a frequency which varies incrementally with time. The frequency from the function generator means 40 increases in predetermined increments as its displacement in time changes or increases absolutely from time zero. Each new frequency preferably starts at the same phase position as the previous frequency. The time zero position $t_o$ may be arbitrarily defined.

It is advantageous to define time zero at the midpoint of the time function that is being processed in the complex Fourier computing system. For example, if an input signal has a duration of 10 seconds it would be advantageous to designate the 5 second point as the time zero position. With the time zero point designated at 5 seconds the first input sample or zero second input would be multiplied by a maximum frequency and the 10 second input sample would be combined with a similar maximum frequency. In this type of arrangement the function generator means 40 generates its maximum frequency and incrementally decreases its frequency to a zero or DC level at time zero and then increases its frequency to a maximum frequency. This arrangement has the important advantages of minimizing the bandwidth that must be generated by the function generator means 40 and minimizing the storage capacity required in the memory means 100. The storage capacity saving arises from the fact that storage requirements are primarily determined by the relationship $W_m = n/2\tau$ where $W_m$ is the bandwidth of the memory, $n$ is related to the time from time zero, that is, the number of samples from time zero, and $\tau$ is the length of the sample period which is generally constant. While the midway positioning is the preferred positioning of time zero, it is, of course, consistent with the invention to choose other arbitrary points as time zero.

The system shown in FIG. 4A comprises a plurality of signal generator means 41—43 which generate trigonometric, sine or cosine waveforms. In a typical embodiment the signal generator means 41 would generate a waveform having a frequency of $k$ cycles per second, signal generator means 42 would generate a waveform having a frequency of $2k$ cycles per second and signal generator means 43 would generate a waveform having a frequency of $4k$ cycles per second. In a typical example, $k$ may be equal to 50 cycles per second.

The output of the signal generator means 41—43 are connected to switch means 44—46, which are representatively shown as switch arms but in an actual embodiment would comprise electronic tubes or solid state switching means such as transistors. The switch means 44—46 are connected to frequency adder means 48—50 and controlled by a control logic means 47. As described with reference to the FIGS. 2 and 3, the function generator means 40 is controlled by the control means 90, which defines a clock pulse generator or logic device. To this end the control logic means 47 defines a portion of the control means 90 and may include a binary counter having three digits and thereby counting from zero to seven, as related to the decimal system. The control means 90, including the control logic means 47, is further described in FIG. 7. The switch means 44—46 are independently closed when a signal representative of a binary one is supplied to the solenoid coil associated with the respective switch means 44—46. The frequency adder means 48—50 function to generate a frequency that is the sum of the input frequencies supplied to it.

In addition to part of function generator 40 being adapted to produce incrementally varying frequencies, a DC voltage source 51 is coupled to an output terminal 52 via switch means 53. The closing of the switch means 53 is controlled by the control logic means 47 and results in the supply of a DC voltage to the output terminal 52. This DC voltage may be representative of a zero frequency.

In operation, with $t_o$ chosen at the time when the first input signal is sampled, the control logic means 47 of control means 90 first closes the switch means 53 resulting in a DC output at terminal 52 representative of a zero frequency. The switch means 44 is then closed by the control logic means 47 generating a binary one resulting in a 50 cycle per second signal being supplied to the frequency adder means 48 which in turn transmits the 50 cycle per second through the frequency adder means 49 and 50. Since no other inputs are supplied to these frequency adder means 49 and 50 the output terminal 52 will be supplied with an output signal of 50 cycles per second. The control logic means 47 will then generate a binary two which results in the closing of the switch means 45 with the other switch means 44 and 46 remaining open. The signal generator means 42 supplies its output of 100 cycles per second to the frequency adder 49. With no other input to the frequency adders 49 and 50 a frequency of 100 cycles per second will be supplied to the output terminal 52 by the frequency adder 49. The control logic means 47 will then generate a binary three which results in the switch means 44 and 45 closing. A closing of switch means 44 and 45 causes the signal generator means 41 to supply a frequency of 50 cycles per second to the frequency adder 48 while the signal generator means 42 supplies a frequency of 100 cycles per second to the frequency adder 49. The frequency adder 48 supplies the 50 cycles per second signal to the frequency adder 49 which sums the two inputs and generates a frequency of 150 cycles per second. This frequency in turn is supplied to the output terminal 52. From this it can be seen that the simplified function generator means of FIG. 4A may generate frequencies in incremental steps of 50 cycles per second from 50 to 350 cycles per second.

If $t_o$ is chosen at the midpoint of the input signal duration, the series of binary signals supplied by the control logic means 47 are arranged to cause the switch means 44—46 to close in a sequence resulting in the highest frequency being first generated, followed by decreasing frequencies until the DC voltage is generated, and then by increasing frequencies until the highest frequency is again generated. Further refinements and more detailed structure is shown in the function generator means of FIG. 4B.

The function generator means 40 as shown in FIG. 4B comprises a plurality of flip-flops 54—57. The flip-flop 54 is controlled by the control means 90 shown in FIGS. 2, 3A and 3B. The control means 90 supplies input pulses at the rate of $m$ per second which would cause the flip-flop 54 to supply an output of $m/2$ cycles per second to the flip-flop 55 and to a low pass filter 58. The flip-flop 55 would in turn supply an output of $m/4$ cycles per second to the flip-flop 56 and the low pass filter 59. This structure and process is repetitive through the flip-flop 57 and the low pass filter 61.

Each of the flip-flops 54—57 are connected to a low pass filter such as the ones 58—61. These low pass filters extract the first harmonic from the flip-flop output which usually takes the form of a square wave. The first harmonic of such a square wave is essentially a sine waveform. The combination of the flip-flops 54—57 and the low pass filters 58—61 make up a plurality of signal generator means such as the ones designated as 41—43 in FIG. 4A.

The output of the low pass filters 58—61 are each connected to a plurality of switch means 62—65. These switch means are typically solid state or electronic switching means which are controlled by a binary counter 71, which defines a clock pulse logic device analogous to control logic means 47 of FIG. 4A and thus which is a particular portion of the basic control means 90. The binary counter 71 is connected to each of the respective switch means 62—65 as previously shown in FIG. 4A. The presence of an input from the low pass filters 58—61 and a binary input from the binary counter 71 results in the switch means 62—65 transmitting an output to a plurality of single sideband modulators 67—70 and to a plurality of phase shifters 71a—72d.

Figure 5:
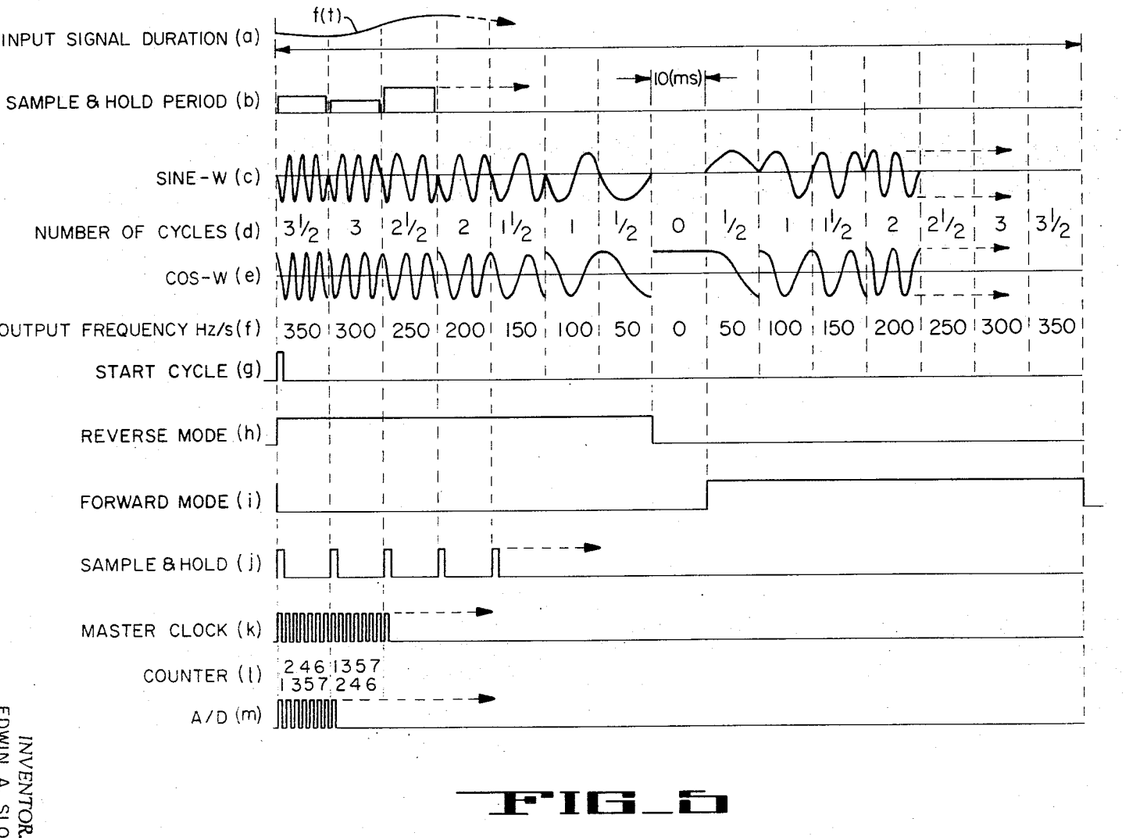
FIG. 5 is a timing diagram for the function generator and control circuits shown in FIGS. 4A, 4B and 7.

The phase shifters 72a—72d shift the output of the switch means 62—65 (90°) so that the sine waveforms transmitted by the switch means 62—65 are transformed to cosine waveforms. The output of the phase shifters 72a—72d are supplied to the single sideband modulators 67—70. The single sideband modulators 67—70 are similar in function to the frequency adder means 48—50 described in FIG. 4A, that is, the sideband comprising the sum of the input frequencies is utilized to perform the frequency addition. In a preferred embodiment these single sideband modulators have separate portions to process the cosine waveform and separate portions to process the sine waveforms. In other embodiments the timing of the system is such that sine waveforms and cosine waveforms are processed at different instances by the same structure, or the sine and cosine waveforms are processed simultaneously by the same single sideband modulator. The modulator 67 has a DC voltage supplied to its cosine portion while the sine portion has a zero voltage input. When a zero count is supplied by counter 71, zero and DC voltages are supplied to the sine and cosine output terminals respectively (See FIG. 5c and e at zero frequency). The output from the single sideband modulators 67—70 are connected in series to the function generator output terminals 52a and 52b. The sine waveform from the sideband modulators 67—70 is connected to the output terminal 52b via an inverter means 74 which is in turn controlled by a control logic device 73 which defines another specific portion of the control logic means 47 and thus of the basic control means 90. The inverter means 74 inverts the phase of all sine functions for time less than zero time. This inversion is necessary as $e^{+j\omega t}$ is the transform of equation (4) at times less than time zero while $e^{-j\omega t}$ is the transform at times greater than time zero. The term $e^{+j\omega t}$ results in $+j\sin wT$ while $e^{-j\omega T}$ results in $-j \sin wT$.

In operation the control logic device 73 which is connected to the binary counter 71 initiates the counteraction which in turn enables the switches 62—65 to conduct in accordance with the supplied binary signal. The control logic device 73 and binary counter 71 are shown as a portion of the control means 90, and are energized by the clock pulses generated within means 90. Typically, the binary counter will start at its highest count which enables the highest frequency to be supplied by the single sideband modulators 67—70 to the output terminals 52a and 52b. As the binary count decreases this maximum output frequency will incrementally decrease to a zero value at zero time. At zero time a DC voltage and a zero voltage are supplied to the output terminals 52a and 52b respectively. The control logic device 73 will then initiate a counting of the binary counter 71 from zero to its highest count which coincides with a frequency range of zero output frequency to the maximum output frequency of the function generator means 40.

Simultaneously with the enabling of the forward count, that is, the count from zero to the highest frequency, the control logic device 73 will enable the inverter means 74 to invert the sine waveform supplied by the single sideband modulators 67—70 to the output terminal 52b via the inverter means 74. Normally the inverter means 74 would transmit the sine function unaffected but when energized it will invert the supply sine waveform or shift its phase 180°.

The function generator means 40 thereby supplies a sine waveform and cosine waveform which has a frequency which varies incrementally from its maximum frequency to zero and then from its zero frequency to a maximum frequency. At the completion of this cycle the counter 71 is reset by the control logic device 73. Thus the function generator 40 of FIG. 4B shows one way of generating a sine and cosine function wherein the time zero is at midpoint of the time function as previously discussed, and wherein the function generator 40 is controlled by control means 90 via particular portions thereof which are further described herein with reference to FIG. 7.

The output waveforms of the function generator means 40 as well as the various timing relationships controlled by the control means 90, are shown graphically in FIG. 5. This figure shows that the generated waveforms of FIGS. 5c and 5e are such that at the beginning of each increment the sine waveform and cosine waveform will begin its generation with the proper phase relationship. For example, each sine waveform (5c) may assume a zero value at the beginning of each increment while each cosine waveform (5e) will assume a value of one at the beginning of each time interval. FIG. 5c shows the generated sine waveform wherein the increment assigned to each interval or sampling interval is 10 milliseconds. The generation of a half-cycle (FIG. 5d) is equivalent too a 50 Hertz per second waveform (FIG. 5f). A 100 Hertz per second waveform would have a complete cycle during the sampling interval, and so on until the 350 Hertz per second frequency which would have 3-½ complete cycles. The cosine waveform is similarly shown in FIG. 5e. FIG. 5g indicates the start of the computing cycle while FIGS. 5h and 5i indicate the output of the control logic device 73 in order to initiate the reverse and forward mode of operation of the counter 71.

Referring now to FIG. 7, there is shown in greater detail the control means 90 and the coupling thereof with the various components previously shown for example in FIGS. 2—4B. More particularly, a master clock 130 provides a train of clock pulses of selected width and repetition frequency to counter means 132 and divider means 134. The divider means 134 is coupled to the sample and hold means 20. The clock pulses are also introduced to the analog to digital converter means 75, 75′ (utilizing the dual converter embodiment of FIG. 3B). The counter means 132 is connected to a decode network 136 and also to the adder means 80, 82 and to the core memory sections 96, 98 of means 94. The decode network 136 is in turn coupled to preset counter means 138, which defines the control logic means 47 of FIG. 4A, and thus includes the binary counter 71 and control logic device 73 of FIG. 4B. The preset counter means 138 provides the plurality of binary code signals to the function generator means 40 via the binary counter 71 thereof, and a sign signal to the inverter means 74 via the control logic device 73 to control the inverter means 74.

The various components of the control means 90 are well known in the art by the terms used hereinabove. For example, the master clock 130 is a conventional pulse generator which is capable of supplying pulses of variable time duration at a selected number per second. The counter means 132 may be a conventional ring counter or sequencer which counts the number of pulses supplied thereto by the master clock 130. The decode network is a conventional decoder (e.g., a digital comparator, which contains a selected arrangement of logical gates and which accepts the counter output and provides a true or false output signal). The divider means 134 may be a conventional divider circuit which provides output pulses which repeat at a selected fraction of the input pulses. The preset counter 138 is formed of the binary counter 71 and control logic device 73 which are similar to those of FIG. 7 and which provide a binary code for selectively actuating the switches of the function generator means 40. The preset counter means 138 also provides a sign signal, wherein the control logic device 73 senses the generation of a zero count by the binary counter 71 and activates the inverter 74 to invert the sine waveform over one-half of the input signal duration.

In operation, referring to FIGS. 5 and 7 an input signal $f(t)$ to be processed is introduced to the input terminal 10 with a selected input signal duration (FIG. 5a). Sample intervals of convenient duration are also selected, as for example, the 10 millisecond sample intervals of FIG. 5b. Note the sample intervals are equal to the time increment of each of the different frequencies generated by the function generator means 40 as depicted in FIGS. 5c and 5e and discussed previously. When sampling of the input signal is desired, a starting pulse (FIG. 5g) is supplied to the master clock 130 and to the decode network 136, whereby the clock pulse train depicted in FIG. 5k is generated. The clock pulses are introduced to the divider means 134, whereby the clock frequency is divided down to repeat at the sampling interval which in this case is every 10 milliseconds. The output of divider means 134 is introduced to the sample means 20 (FIG. 5j) whereby the amplitude of the input signal is sampled and held for each sampling interval as depicted in FIG. 5b. The input signal amplitude sampled by the sample means 20 is introduced to the multiplier means 30,32. The master clock pulses from the master clock 130 are introduced to the analog to digital converter means 75, 75' as depicted in FIG. 5m.

Counter means 132 provides the usual function of counting the clock pulses from master clock 130 shown in FIG. 5(l), and also accesses the core memory means 94 through a selected number of scans determined by the number of input words to be analyzed. That is the number of harmonics to be calculated determines the number of master clock pulses, where the latter number corresponds to the number of addresses in the core memory means 94. (Since memory means 94 is actually two separate memory sections 96, 98, the number of master clock pulses is actually equal the number of addresses).

The decode network 136 analyzes the counter means 132 output and indicates that a scan through the core memory means 94 has been completed, and with each scan controls the frequency being generated by the function generator means 40 via the preset counter means 138. That is, the decode network 136 determines that another sample is to be taken, but first determines a change to another frequency via the preset counter means 138. The preset counter means 138 sets the switches of the function generator means 40 as described in FIGS. 4A and 4B supra, wherein the largest binary number is first generated by the binary counter 71 (FIG 4B) of the preset counter means 138, to generate the 350 Hertz per second frequency first, and so on through the successive frequencies of FIGS. 5c and 5e, as described supra.

Each frequency signal (cosine and sine waveforms) generated by the function generator means 40 is introduced to the multiplier means 30, 32 and is multiplied by the input signal amplitude introduced thereto via the sample means 20. The analog products of the multiplier means 30, 32 are then introduced to their respective analog to digital counter means 75, 75', which scan the products at the rate determined by the clock pulses introduced thereto (FIG. 5m) via the master clock 130. Each converter scan is introduced to the core memory means 94 via respective digital adder means 80, 82, and is stored in respective memory sections 96, 98 as a word, in response to the access signals introduced via the counter means 132. The counter means 132 is then reset, the sample means 20 samples the next input signal amplitude, the function generator 40 generates the next frequency, and the converter means 75, 75' introduce the next series of products to the core memory means 94 as accessed by the counter means 132, whereby respective words are added to the corresponding word of the previous sample series and are stored in the core memory means 94. This process continues until all 10 milliseconds samples are taken of the input signal, whereby the Fourier transform signals are stored in the core memory sections 96, 98 as real and imaginary values respectively. Note that at such time as the preset counter 138 i.e., the control logic device 73, FIG. 4B) senses the zero frequency (or midpoint of the input signal duration) it activates the inverter means 74, whereby as previously discussed, the sign of the increasing frequencies generated by the sine waveform portion of the function generator means 40 (FIGS. 4A and 4B) is reversed.

When employing the single analog to digital converter embodiment of FIG. 3A the clock pulses which control the converter means 75, 75' of FIG. 7 may be also used to control the switches 38, 79 to allow alternate use of the converter means 75. A delay is supplied accordingly between sampling of the sine and cosine functions to allow thus the use of the single converter means.

It should be understood that while a trigonometric function generator has been disclosed in detail it is within the broad aspects of the invention to utilize other function generators such as might be termed cylindrical or circular function generators.

COMPLEX TIME DATA SYSTEM

The basic system shown in FIG. 2 and the more detailed systems of FIGS. 3A and 3B can readily be expanded to accommodate time domain data that contains both real and imaginary inputs. Such data may, for example, arise from an elliptically polarized radio wave that is transduced into orthoginal components by an appropriate antenna. The basic system for accomplishing the processing of such data is shown in FIG. 6.

Figure 6:
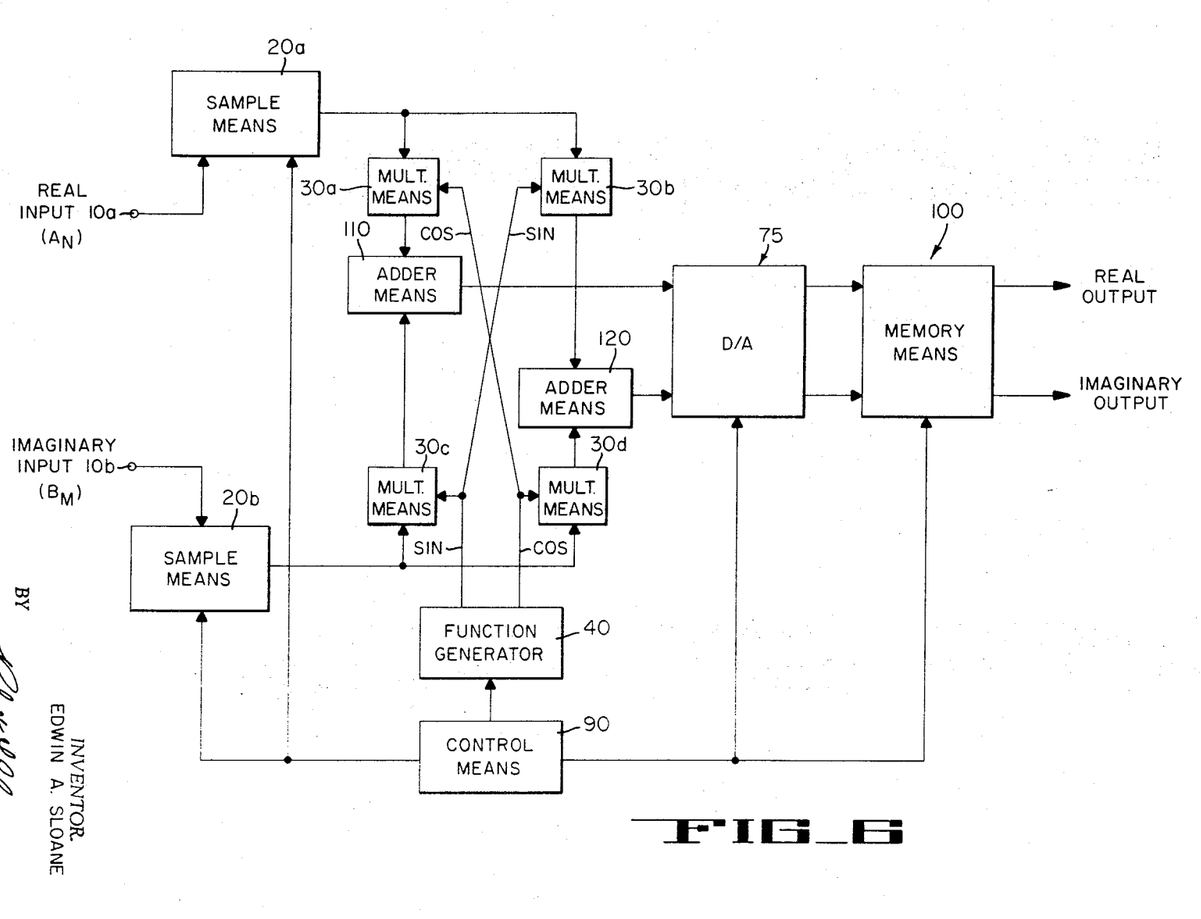
FIG. 6 is a further expansion of the systems shown in FIGS. 3A and 3B in order to accommodate the processing of a complex time function data which includes imaginary components.

The similarity between the system of FIG. 6 and the systems disclosed in FIGS. 2, 3A and 3B is readily apparent. From equation (9) it follows that the complex Fourier transform of a complex time function can be generated by first resolving the time function into its orthoginal component to form two inputs. The resulting inputs are each supplied to a pair of sample means 20a and 20b which are substantially identical in function and operation as described with reference to the sample means 20 of FIGS. 2 and 3. These sample means 20 a and 20b are each in turn connected to a pair of multiplier means 30a and b, and 30c and d. The multiplier means 30a—30d are substantially identical with the multiplier means 30 described with reference to the prior figures. Like the systems of FIGS. 2, 3A and 3B, each multiplier means 30a—30d is supplied with a trigonometric function by the function generator means 40 and with a signal representative of the amplitude of the sample by the sample means 20a and b. The multiplier means 30a and b are supplied with a sample signal ($A_n$) from the real input terminal 10a while the multiplier means 30c and d are supplied with a sample signal $B_n$ from the imaginary input terminal 10b. The function generator means 40 supplies signals representative of sine functions to the multiplier means 30b and c while signals representative of cosine functions are supplied to the multiplier means 30a and d. The sine and cosine functions vary incrementally in substantially the same manner as described with reference to the function generator means 40 of FIGS. 2, 3, 4 and 5. It should be understood that function generator 40 in this case must supply a full cycle where a half-cycle was previously supplied, two cycles where one cycle was supplied and so on. The extra generated cycles are designated as negative frequencies necessary to define the complex time function. This alteration is necessary to compensate for the lack of symmetry in complex time functions thus a full period or cycle is provided to define equation (9).

The output of the multiplier means 30a is the analog of the term $A_n \cos(w_z + nw_y)t$ while the output of the multiplier 30c is the analog of the term $B_n \sin(w_z + nw_y)t$. These outputs from the multiplier means 30a and 30c are supplied to an adder means 110. This adder means 110 may be of construction similar to the adder means 80 and 82 described with reference to FIGS. 3A and 3B. The output of the adder means 110 is the analog of the real component of the transformed complex time function. This output is connected via digital to analog converter means to a coherent memory, the components being identical to the converter means 75 and the coherent memory 100 respectively, described in FIGS. 3A and 3B. The required capacity of the memory 100 is greater in the case of complex time functions because the symmetry attendant a real time function (and its odd and even functions) is not present in complex time function. The complex time function is still periodic but a full cycle or period is necessary to define its transform. The full period requires greater storage capacity. The real component stored in the memory 100 is defined by the first portion of the right hand side of equation (9).

The imaginary component of the transform which is the second portion of the right hand side of equation (9) is generated by the multiplier means 30$b$ and $d$, and the adder means 120. The multiplier means 30$b$ is supplied with a sample of the real component ($A_n$) and a sine function while the multiplier means 30$d$ is supplied with a sample of the imaginary component ($B_n$) and the generated cosine function. The output of the multiplier 30$b$ is the analog of the term $A_n$ sin $(w_z+w_y)t$ while the output of the multiplier means 30$d$ is the analog of the term $B_n$ cos $(w_z+nw_y)t$. These outputs of the multiplier means 30$b$ and $d$ are combined in the adder means 120 wherein the value supplied by the multiplier means 30$b$ is assigned a negative value or is a subtract means. The output from the adder means 120 is supplied to the coherent memory means 100 via the analog to digital converter means 75.

A control means 90 substantially identical to the control means described with reference to FIGS. 2—7 controls the timing and synchronism of the sample means 20, the function generator means 40, the converter means 75 and the coherent memory means 100. The exact timing will depend on the many specific details and components of the system, such as, the sharing of similar components and other variations. In low performance systems where cost is foremost and performance secondary the processing of the real and imaginary inputs may be accomplished by storing the samples of the imaginary and real component of the complex time data while processing the real and imaginary Fourier transform components separately.

From the above description it can be seen that the basic system and system concept is readily adaptable for the processing of time functions that contain both real and imaginary components. This aspect of the invention may or may not be included in a particular system depending on the type of data that is to be supplied to the input terminal 10 and the type of analysis to be performed.

INVERSE TRANSFORMATION

It can be shown that the inverse transformation may be generated by providing a sine and cosine function of a frequency determined by the position of a spectral line in the frequency function and of amplitude proportional to the amplitude of the spectral the spectral line. The sine and cosine functions are provided by a function generator such as the function generator 40 (FIGS. 3) with an inversion of the phase of the sine function in accordance with equation (3$b$). The amplitude proportionality is obtained by sampling a frequency function such as a Fourier transform stored in core memory means 94 at the completion of the computation of the Fourier transform or supplied by an independent frequency function source of means. The amplitude signal and the sine and cosine functions are successively supplied to multiplier means to obtain frequency-sine and/or frequency-cosine products. The sum of these products are coherently stored in memory means such as the memory 100 (FIG. 3). From this brief description it can be appreciated that the inverse transformation is generated in essentially the same manner that the Fourier transform is generated with the exceptions that a frequency function forms the input in the generation of the inverse transform and the function generator provides a phase shifted waveform. The generation of the inverse transform will be better understood when the autocorrelation and cross-correlation are considered with reference to FIG. 9. The solution of these problems involves the generation of the inverse transform.

In conclusion, the invention system provides a new arrangement for generating complex Fourier transforms. The system is simple, fast, and low in cost, and generates a transform pair only milliseconds after the termination of the input data.

I claim:

1. A computer for deriving a Fourier transform from an input signal during a selected input signal duration, the combination comprising:

control means for generating an interrelated plurality of series of clock pulses;

means for generating signals representing successive increments of a function, wherein the function is defined as having a characteristic which changes with each increment relative to the passage of computing time, and a new increment is generated in response to each clock pulse of a selected one of the series of clock pulses applied thereto;

sample and hold means for sampling the input signal at selected sampling intervals during the input signal duration to provide a sampled signal at said selected sampling intervals and for generating an output signal representative of the amplitude of said sampled signal, wherein the increments of said incrementally varying function have a predetermined value for each successive one of said sampling intervals;

input means for introducing said input signal to said sample and hold means;

multiplier means coupled to said means for generating and to said sample and hold means for multiplying selected increments of the function by respective sampled signals to derive product signals;

storage means operatively coupled to the multiplier means for storing the product signals derived by said multiplier means;

wherein said control means is operatively coupled to said sample and hold means, to said means for generating, and to said storage means to provide to each of the means a respective series of clock pulses;

wherein the sample and hold means samples the input signal at the start of each sampling interval in response to its respective clock pulses, the means for generating a function generates a successive increment during each sampling interval in response to its respective clock pulses, and said multiplier means effects said multiplying of the function increments by the sampled input signals and introduces the resulting product signals to the storage means, said control means including means to access the storage means in response to its respective series of clock pulses to store the products in the storage means, said storage means providing an up-to-date Fourier transformation in real time for the input signal introduced to the sample and hold means; and means associated with the storage means for utilizing the up-to-date Fourier transformation in real time.

2. The computer of claim 1 wherein the Fourier transform is derived from a time limited, bandwidth limited, time function input signal, wherein the means for generating includes elements which cooperate to provide a trigonometric function with a frequency which varies incrementally with the passage of time, wherein a different predetermined frequency is generated during each successive sampling interval; said multiplier means including elements to multiply the successive signals corresponding to the frequencies of the trigonometric function by the respective sampled signals and introduces the product signals thereof to said storage means.

3. The computer of claim 2 wherein said means for generating further includes elements for generating sine and cosine function signals that have a frequency which varies incrementally from sample interval to sample interval, said frequency varying in proportion to its position in time from an arbitrarily selected time zero position, wherein the multiplier means further includes elements for successively multiplying the sine function signal by the sampled signal and the cosine function signal by the sampled signal and introduces the product signals thereof to said storage means for storage therein as a Fourier transform in response to said means for accessing the storage means.

4. The computer of claim 3 wherein said time zero is defined as the midpoint of said selected input signal duration, and the elements of said means for generating first generate incrementally decreasing frequencies, then zero frequency, and then generate incrementally increasing frequencies.

5. The computer of claim 4 wherein one of the series of clock pulses comprises a sign signal, and wherein the elements of said means for generating include inverter means defining a part of said control means for inverting the phase of said generated sine function in response to said sign signal for times less than time zero to enable said means for generating to generate the incrementally decreasing, zero and increasing frequencies.

6. The computer of claim 5 wherein the elements of said multiplier means are adapted to multiplex said sine and cosine function signals by said sampled signals to provide sine-sample products and cosine-sample products respectively said storage means stores the sine-sample and cosine-sample products in separate storage sections in response to the means to access the storage means, and adder means integral with the storage means and coupled to the multiplier means for adding the values stored in said separate storage sections to the subsequent sine-sample and cosine-sample products respectively received from the multiplier means in response to the means to access.

7. The computer of claim 3 wherein said input signal is an analog signal, said means for multiplying is an analog multiplier means, and includes means for converting the analog multiplier means product output into a digital output, and said storage means is a digital memory means.

8. The computer of claim 7 wherein the storage means includes digital adder means coupled to the means for converting and responsive to the control means for adding the value stored in said digital memory means from a previous multiplication to the succeeding product output of said analog multiplier means, said digital adder means defining a part of said digital memory means to define a coherent memory.

9. The computer of claim 3 wherein said elements of said means for generating further comprises:

plurality of signal generator means for generating a sinusoidal waveform output signal, the frequency of said output signals from each of said signal generator means being different and a multiple of the lowest frequency output from one of said signal generator means;

frequency adder means coupled to the signal generator means for adding the output signals of the signal generator means;

switch means for selectively coupling said frequency signal generator means to said frequency adder means; and wherein the control means includes control logic means integral therewith for generating a binary code for selectively enabling said switch means to couple said frequency adder means to a predetermined plurality of signal generator means to define an output signal from the means for generating that is the sum of the frequencies generated by the plurality of signal generator means.

10. The computer of claim 3 wherein said input signal defines a frequency function, said sample and hold means includes elements for sampling the input signal at given sample intervals to generate an output signal representative of the frequency of the sampled function, and said means for generating sine and cosine function signals is further adapted to provide a waveform of selected phase shift.

11. The computer of claim 3 including first and second sample and hold means for receiving real and imaginary inputs respectively of a complex time function, wherein said multiplier means includes a first pair of multipliers which respectively receive the sine and cosine function signals and a second pair of multipliers which respectively receive the cosine and sine function signals introduced to the pairs of multipliers by the means for generating said function signals, and second adder means operatively coupled to the two pair of multipliers for providing output signals which define the real and imaginary components of the transformed complex time function, said components being introduced to the storage means to define a Fourier transform of the complex time function.

12. The computer of claim 3 wherein said control means further comprises:

master clock means for generating a train of clock pulses;

counter and decode means coupled to the master clock means for scanning the storage means and the adder means to access same through a selected number of scans, and to determine the frequencies and duration of the predetermined frequencies generated by the means for generating;

preset counter means coupled between said counter and decode means and said means for generating to provide a binary code to the latter in response to the master clock means to select said predetermined frequencies during successive sampling intervals.